United States Patent [19]

Evans

[11] Patent Number: 4,864,671
[45] Date of Patent: Sep. 12, 1989

[54] CONTROLLABLY INFLATABLE CUSHION

[75] Inventor: Donald L. Evans, Lithia Springs, Ga.

[73] Assignee: Decubitus, Inc., Atlanta, Ga.

[21] Appl. No.: 174,237

[22] Filed: Mar. 28, 1988

[51] Int. Cl.$^4$ ............................................. A47C 27/10
[52] U.S. Cl. ........................................ 5/453; 5/455; 5/469
[58] Field of Search .................. 5/453, 455, 456, 469, 5/449

[56] References Cited

U.S. PATENT DOCUMENTS

| | | |
|---|---|---|
| 1,468,072 | 9/1923 | Ogle . |
| 1,745,953 | 2/1930 | McCollum . |
| 2,136,510 | 11/1938 | Jensen . |
| 2,260,437 | 10/1941 | Chambers . |
| 2,604,641 | 7/1952 | Reed . |
| 2,838,099 | 6/1958 | Warner . |
| 3,112,956 | 12/1963 | Schick et al. . |
| 3,192,540 | 7/1965 | Swank . |
| 3,467,081 | 9/1969 | Glass ........................................ 5/453 |
| 3,587,568 | 6/1971 | Thomas ................................. 128/33 |
| 3,605,143 | 9/1971 | Smith . |
| 3,605,145 | 9/1971 | Graebe . |
| 3,674,019 | 7/1972 | Grant ..................................... 128/33 |
| 3,740,777 | 6/1973 | Dee . |
| 3,870,450 | 3/1975 | Graebe ................................... 425/269 |
| 3,982,786 | 9/1976 | Burgin et al. .......................... 297/284 |
| 4,005,236 | 1/1977 | Graebe ................................... 428/72 |
| 4,161,794 | 7/1979 | Darnfors ................................ 5/441 |
| 4,175,297 | 11/1979 | Robbins et al. ...................... 5/284 |
| 4,190,286 | 2/1980 | Bentley ................................. 297/284 |
| 4,193,149 | 3/1980 | Welch ................................... 5/453 |
| 4,225,989 | 10/1980 | Corbett et al. ....................... 5/453 |
| 4,267,611 | 5/1981 | Agulnick ............................... 5/455 |
| 4,370,769 | 2/1983 | Herzig et al. ......................... 5/452 |
| 4,391,009 | 7/1983 | Schild et al. .......................... 5/455 |
| 4,422,194 | 12/1983 | Viesturs et al. ...................... 5/451 |
| 4,541,136 | 9/1985 | Graebe ................................... 5/456 |
| 4,551,874 | 11/1985 | Matsumura et al. ................... 5/453 |
| 4,583,255 | 4/1986 | Mogaki et al. ........................ 5/455 |
| 4,592,589 | 6/1986 | Hellwig ................................ 297/284 |
| 4,617,690 | 10/1986 | Grebe ..................................... 5/453 |
| 4,622,706 | 11/1986 | Takeuchi ................................ 5/455 |
| 4,637,083 | 1/1987 | Goodwin ............................... 5/449 |
| 4,642,825 | 2/1987 | Kurita ................................... 5/453 |
| 4,662,012 | 5/1987 | Torbet .................................... 5/455 |
| 4,694,520 | 9/1987 | Paul et al. .............................. 5/455 |
| 4,698,864 | 10/1987 | Graebe .................................. 5/441 |
| 4,711,275 | 12/1987 | Ford et al. ............................ 5/453 |

FOREIGN PATENT DOCUMENTS

| | | | |
|---|---|---|---|
| 2813309 | 10/1978 | Fed. Rep. of Germany | 5/455 |
| 2816641 | 10/1978 | Fed. Rep. of Germany | 5/455 |
| 2807038 | 8/1979 | Fed. Rep. of Germany | 5/455 |
| 2919438 | 11/1980 | Fed. Rep. of Germany | 5/455 |
| 2107197 | 4/1983 | United Kingdom | 5/453 |

Primary Examiner—Alexander Grosz
Assistant Examiner—Eric K. Nicholson
Attorney, Agent, or Firm—Kilpatrick & Cody

[57] ABSTRACT

A controllably inflatable cushion that includes a number of independently inflatable rows or zones of cells. Each row or zone is connected to the pressure port of a corresponding three-way valve, and the intake ports of the valves are connected to a pump. The pump and valves are controlled by a microprocessor control means which receives input from a pressure sensor and input switches. The input switches allow the user to set desired inflation sequences of the rows or zones and pressures at which the cushion is to be inflated. The pressure sensor provides feedback signals to control inflation pressure. The microprocessor also actuates light-emitting diodes or other indicator means to let the user know when the device is on, when the pump or any valve is actuated, or when the battery in the power supply is low. The exhaust ports of the valves are advantageously connected to an aeration manifold formed of perforated tubing and located in the cushion which supplies fresh air to spaces between the cells in order to make the cushion more comfortable and to reduce heat, friction and possibility of blister or decubitus ulcer development.

12 Claims, 6 Drawing Sheets

CONTROLLABLY INFLATABLE CUSHION

This invention relates to inflatable cushions for use in wheelchairs, hospital beds and other applications.

BACKGROUND OF THE INVENTION

Those who use wheelchairs, patients who are bedridden, airline pilots, truck drivers and others who must remain sitting or lying in one position for long periods of time typically face the prospect of developing decubitus ulcers or "bed sores." These ulcers are believed to originate in part from pressure and a lack of circulation in areas of the body supporting the person. Such ulcers are painful and they present the risk of large-scale serious infection which often penetrates deeply into tissue within the body. As is the case in management of many other types of medical problems, frequently the best treatment for such a condition is prevention. It has recently been found that total relief from pressure on an area of the body from time to time is required in order to minimize the possibility of decubitus ulcer formation in that area.

Previous approaches to preventing decubitus ulcer formation include uses of water-filled cushions, foam cushions and cushions inflated with air. Air-filled cushions enjoy a number of advantages in such applications, including weight, expense and ease of controlling cushion pressure.

Many earlier approaches recognize the value of a cushion which has two sets of pockets or cells which may be alternately inflated and deflated to remove pressure from the patient's skin. U.S. Pat. Nos. 4,225,989 issued Oct. 7, 980 to Corbett et al.; 4,175,297 issued Nov. 27, 1979 to Robbins et al.; 3,674,019 issued July 4, 1972 to Grant; and 3,587,568 issued June 28, 1971 to Thomas all disclose mattresses or pillows having two or more sets of elongated pockets or cells. The Corbett, Robbins and Thomas patents show mattresses having two sets of elongated pockets in which a valve alternately inflates and deflates the pockets. The Corbett and Thomas patents utilize fluid valves or switches to divert pressurized air alternately from one set of pockets to the other. Control of pressure at which the cushion is inflated and the time intervals for inflation are perhaps best controlled by controlling air pressure applied to the fluid switch. Such control is imprecise, however, and control of inflation pressure is linked to inflation interval.

The Robbins patent discloses an electrically controlled valve which controls inflation of two sets of pockets in a pillow. Air pressure applied to the pockets may be adjusted by adjusting set screws in the valve. Although pressure may perhaps be regulated independently of inflation sequence according to this arrangement, pressure regulation by turning set screws can be cumbersome and inconvenient, especially for a bedridden or immobile person.

U.S. Pat. Nos. 4,617,690 issued Oct. 21, 1986 to Grebe and 4,551,874 issued Nov. 12, 1986 to Matsumura et al. disclose the concept of controlling inflation sequence in a number of sets of pockets or cells of a cushion in order to minimize onset of decubitus ulcers. These patents thus address several shortcomings of the cushions which only alternately inflate two sets of pockets or cells. First, they eliminate the tendency of such cushions merely to recompress a skin area which has just been relieved of pressure as pockets or cells are alternately inflated and deflated. Second, inflation cycle and pressure can be adjusted to relieve pressure on portions of the patient under most pressure and thus most prone for development of ulcers, such as areas supported by bony regions. Matsumura, for instance, discloses an inflatable bed mattress with pockets whose inflation is controlled by a number of three-way valves which may be manually controllable or automatically controllable.

Recent advances in cushion technology have made available cushions with a number of independently inflatable cells, rather than elongated pockets as disclosed in the patents mentioned above. Cushions formed of these independent cells can more readily and easily conform in shape and pressure to the persons they support. U.S. Pat. No. 4,422,194 issued Dec. 27, 1983 to Viesturs et al., which is incorporated herein by this reference, discloses such a cushion. U.S. Pat. Nos. 3,870,450 issued Mar. 11, 1975; 4,005,236 issued Jan. 25, 1977; 4,541,136 issued Dec. 17, 1985; and 4,698,864 issued Oct. 13, 1987 to Graebe, which patents are incorporated herein by this reference, also disclose such cushions. U.S. Pat. 4,005,236 to Graebe, for instance, discloses a multi-cell structure which has a number of rows and columns of interconnected inflatable cells. U.S. Pat. No. 4,698,864 to Graebe discloses such a cushion in which the cells are arranged in zones with the interiors of the cells for each zone being in communication and isolated from the interiors of cells in other zones. The cells may be of varying height to contour the surface of the cushion for additional comfort. These patents for cellular cushions fail to disclose a system for controlling sequence, interval and pressure of cell inflation, however.

SUMMARY OF THE INVENTION

The present invention provides a cushion formed of rows or zones of interconnected inflatable cells. Each row or zone of cells may be inflated to a desired pressure independently of the other rows or zones, and the rows or zones may be inflated according to a large number of sequences and intervals in order to optimize comfort of the cushion and control pressure on sensitive parts of the body.

Devices according to the invention include microprocessor controlled programmable circuitry which contains switches that allow the user to set desired pressure, inflation sequence and interval of cell rows or zones easily and quickly. The circuitry monitors the settings on these switches as well as feedback signals produced by a pressure sensor attached to the air supply in order to generate signals that actuate a pump and a number of three-way valves which feed rows or zones of cells in the cushion. The microprocessor may be programmed to inflate cell rows according to a large number of desired intervals and sequences. It also produces signals to actuate indicators such as LEDs in order to inform the user when a pump or valve is actuated, when the power supply battery is low or when the device is on.

In such fashion, cell rows or zones can be totally deflated to atmospheric pressure for controllably variable periods of time to relive all pressure from parts of the body supported by such rows or zones. Such pressure relief has been found to be virtually the only way to prevent decubitus ulcer formation without the patient being required to shift his or her weight, because it allows circulation of fresh blood to these body parts, thus replenishing oxygen to tissue and removing stagnant blood and waste for recycling by the body.

Exhaust air from the cells is advantageously routed back through the valves to aeration ducting in the cushion. Such ducting includes a number of perforated tubes or ducts, each of which lies between a row of cells. Fresh air is thus provided to the cushion environment in order to reduce heat and friction accumulation and the possibility of blister and decubitus ulcer formation.

It is therefore an object of the present invention to provide a controllably inflatable cushion which is comfortable, which may be adjustably and controllably inflated to minimize or eliminate pressure on any part of the anatomy supported by the cushion and which may be inflated according to a virtually infinite number of sequences and intervals.

It is an additional object of the present invention to provide a comfortable cushion comprising a number of cells and an aeration manifold located between the cells to provide fresh air to the cushion and thus reduce heat, friction and possibility of blister and decubitus ulcer formation.

It is a further object of the present invention to provide a cushion which is automatically controlled by a microprocessor, which draws minimum power, and which may be easily adjusted to accommodate desired settings for pressure within the cells and sequences in which the cells are to be inflated.

It is a further object of the present invention to provide an inexpensive, quiet, controllably inflatable cushion which is helpful in preventing medical problems caused by decubitus ulcers.

Other objects, features and advantages of the present invention will become apparent with reference to the remainder of this document.

BRIEF DESCRIPTION OF THE DRAWINGS

FIG. is a schematic view of a cushion according to the present invention with related pump, valves and control circuits.

DETAILED DESCRIPTION OF THE DRAWINGS

Figure 1:
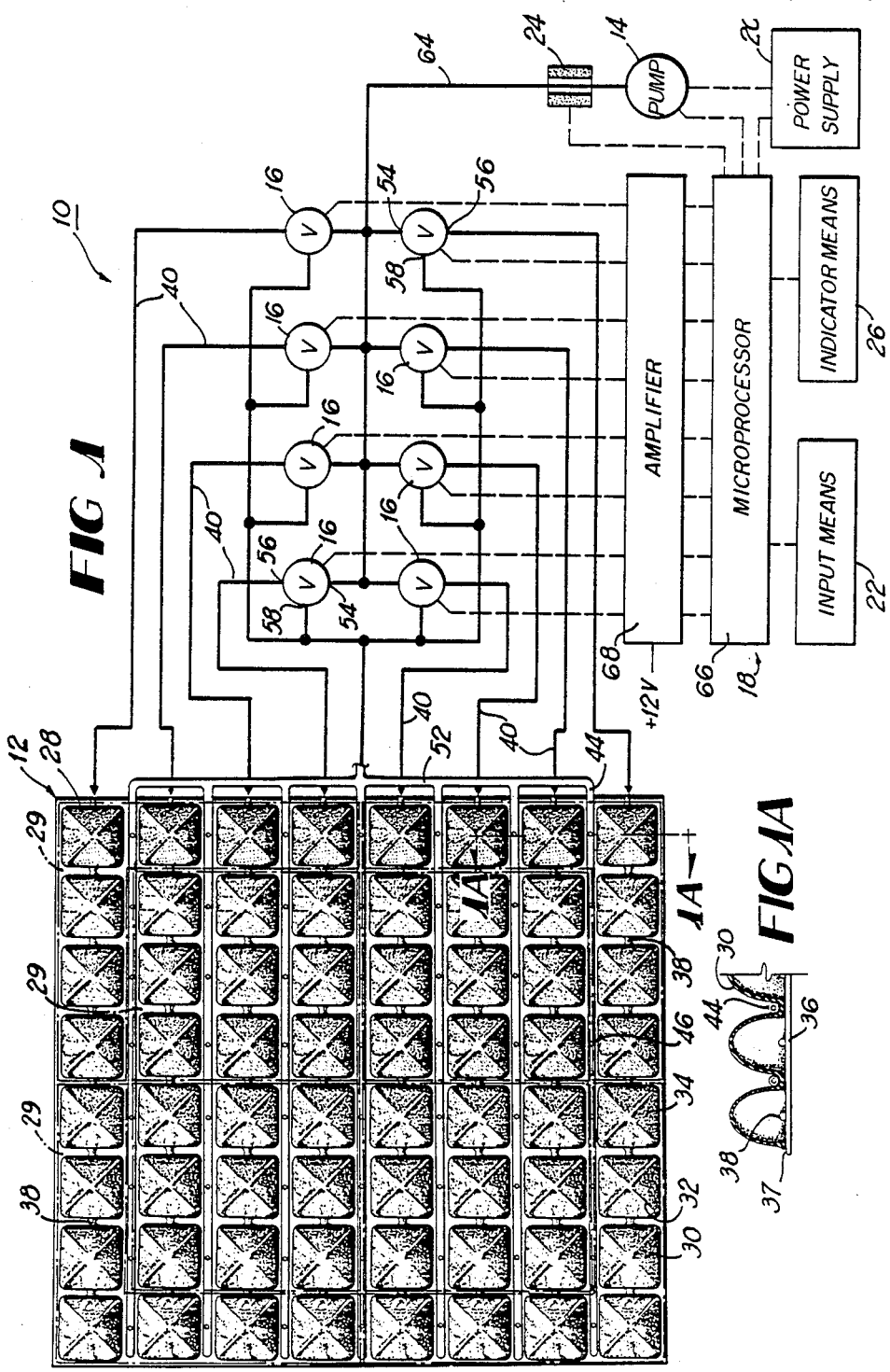
FIG. 1B is a cross section of a portion of the cushion of FIG. 1A, shown along line 1B—1B of FIG. 1A.

FIG. 1 shows in schematic form a preferred embodiment of a device 10 according to the present invention. Device 10 generally comprises a cushion 12, a pump 14, a plurality of valves 16 connected to the pump 14 and the cushion 12, and microprocessor control means 18 connected to pump 14, valves 16 and a power supply 20. Power supply 20 is also connected to pump 14 and valves 16.

Microprocessor control means 18 receives input signals from input means 22 which the user may set to control desired sequence of inflation of rows of cells in cushion 12, as well as pressure in those cells. Microprocessor control means 18 also monitors feedback signals from one or more pressure sensors 24 which may be mounted on the cushion itself, on air supply conduits or at other desired locations. Microprocessor control means 18 uses signals from input means 22 and sensor means 24 to control operation of pump 14 and valves 16. It also actuates indicator means 26 such as light emitting diodes or a liquid crystal display for indicating the operating status of the device 10 to the user.

Structure of a first form of cushion 12 is shown in FIGS. 1A and 1B. Cushion 12 comprises a number of rows 28 or zones 29 of independently inflatable cells 30. Cushion 12 is formed of a flexible material such as rubber or polymeric material so that cells 30 may return to a uniform, upright shape when deflated. Cells 30 ma have flexure ridges 32 and folds 34 located between ridges 32, both extending longitudinally of the cells 30, to assist cells 30 in resuming a uniform, upright shape when deflated. Cells 30 shown in FIG. 1 are generally square shaped in plan cross section, but they may also be circular or of any other desired shape. Such cells are disclosed in the patents to Graebe mentioned above.

Cells 30 are attached in sealing relationship to a bottom sheet 36, which is also preferably made of flexible rubber or polymeric material, to form a web 37 supporting cells 30. Manufacture of cushion 12 in this configuration may be accomplished by molding a first member from rubber or polymeric material which forms the cells 30. Cells 30 can be injection molded, blow molded, molded with a male mold form or otherwise formed. They can then be glued, heat bonded or otherwise attached to sheet 36 to form the structure shown in FIG. 1B. Such construction is conventional; one type of method is described in the patents to Graebe mentioned above.

Figure 2:
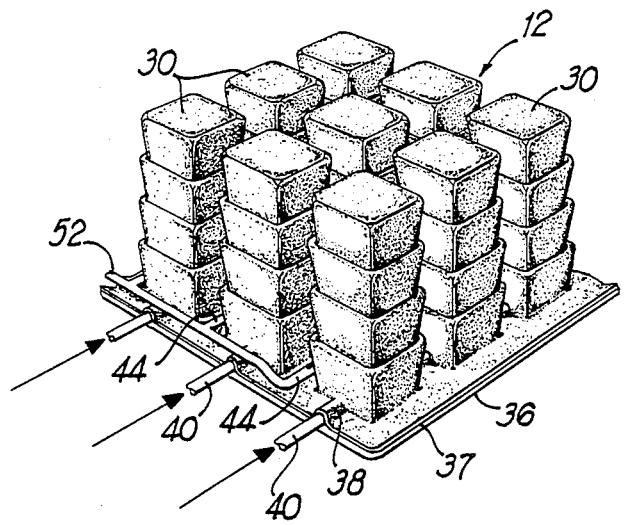
FIG. 2 is a perspective view showing portions of a second type of cushion according to the present invention.
Figure 2A:
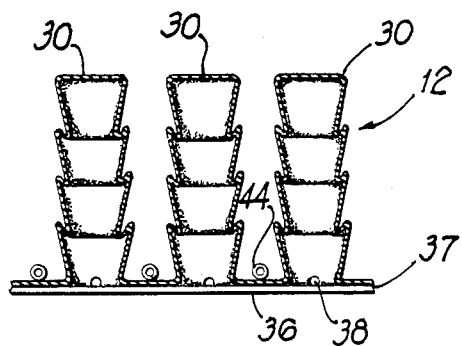
FIG. 2A is a cross-section of a portion of the cushion of FIG. 2.

A second form of cushion is shown in FIGS. 2 and 2A. These figures show a cushion 12 formed of a plurality of cells 30 which may contract and expand in an accordion fashion. Such cells 30 have larger surface areas on their top surfaces and are more comfortable for the user. Their Christmas-tree like shape allows for quick and efficient molding during manufacture.

Unlike cells 30 in earlier existing cushions, cells 30 in cushions 12 of the present invention are preferably interconnected in rows 28 for inflation by a corresponding valve 16. Rows 28 may also be grouped and interconnected to be under common control of a single valve 16. Similarly, cells 30 may be grouped into inflation zones 29 such as squares of cells 30, each zone 29 for inflation by a single valve 16. Square zones 29 and L-shaped zones 29 are shown schematically in FIG. 1A, for instance. Zones 29 can be of other desired configuration.

A passageway 38 extends between cells 30 in each row 28 or zone 29 so that cells 30 in that row or zone may be inflated with a single source of air. Passageway 38 may comprise raised portions of the first member of material which is attached to web 36 to form cushion 12. Passageway 38 has an opening adjacent to one end of cushion 12 so that a pressurization conduit may be connected to passageway 38 for controlling inflation of cells 30 in row 28 or zone 29. In cushion 12 shown in FIG. 1A, eight rows 28 of eight cells 30 each are controlled by eight pressurization conduits 40. Pressurization conduits 40 in the preferred embodiment are ⅛ inch tubing. Each pressurization conduit 40 connects a row 28 or zone 29 of cells 30 to that row or zone's corresponding valve 16.

Cushion 12 also contains an aeration manifold 42 which allows air to circulate around cells 30 in cushion 12 in order to reduce heat, friction and consequent blistering and development of decubitus ulcers from prolonged support by cushion 12.

Aeration manifold 42 is formed of a plurality of aeration ducts 44 which are connected or attached to cushion 12 or are formed integrally with it and which extend lengthwise between rows 28 of cells 30. Ducts 44 in the preferred embodiment are ⅜ inch tubing perforated with a plurality of aeration ports 46 which vent air to the spaces around cells 30. A first end 48 of each duct 44 is sealed, and the other end 50 communicates with and is connected to a common duct 52. Common duct 52 in the preferred embodiment is of ⅛ inch tubing, and it supplies pressurized air to each aeration duct 44. Common duct 52 is in turn connected to the valves 16 as shown schematically in FIG. 1. Common duct 52 and aeration ducts 44 may be formed as part of the first sheet of material which is molded to form cells 30 and passageways 38; it may also be formed, configured and oriented in a number of other arrangements as will be apparent to those having ordinary skill in this art. Aeration manifold 42 may be connected to valves 16 by an exhaust conduit 53 which, in the preferred embodiment, is ⅛th inch tubing.

Valves 16 control inflation of cells 30 of cushion 12, as well as operation of aeration manifold 42. Valves 16 are preferably conventional three-way valves which have an intake port 54 for receiving pressurized air, a pressure port 56 for supplying pressurized air to the valve's corresponding row 28 or zone 29 of cells 30 and an exhaust port 58 for supplying air exhausted from cells 30 to aeration manifold 42. Opening, closure and connection of ports 54, 56, and 58 are controlled by conventional gate means 60 (not shown) such as a ported piston. Gate means 60 is in turn actuated by an actuation means 62. Actuation means 62 in the preferred embodiment is a conventional solenoid. Voltage and power requirements are preferably minimal to draw minimum power from power supply 20 and thus prolong the life of batteries in that power supply. In the preferred embodiment, valves 16 are 10 p.s.i. maximum rated pressure 12 volt d.c. model number AM029 valves provided by Angar Scientific, a subsidiary of ASCO. These valves are mounted on a metal block manifold part number 451005, also provided by Angar Scientific, which has interior conduits connected to a single exhaust connector for exhaust conduit 53, intake conduits connected to a common intake connector for connection to the pump 14 and an individual connector communicating with the pressure port 56 of each valve 16 for connection to pressurization conduits 40.

Valves may be configured always to connect pressure port 56 with either intake port 54 or exhaust port 58. Such a configuration, however, fails to allow the row of cells 28 or zone 29 supplied by that valve 16 to remain inflated without requiring pressure from pump 14. Valves 16 thus preferably are configured so that pressure port 56 can be sealed to maintain pressurization of cells 30 in corresponding row 28 or zone 29 without the need to require such pressure. Intake port 54 can thus preferably be sealed so that output from pump 14 is not bled off through exhaust ports 58 when it could instead be applied only to pressure ports 56 of valves 16 corresponding to cell rows 28 or zones 29 which are being inflated. Increased control complexity of valves having this configuration may, however, make acceptable the trade-off of increased power requirements of the either-/or type valve 16.

The intake ports 54 of each valve 16 are connected via at least one intake conduit 64 to pump 14. Intake conduit 64 in the preferred embodiment is ⅛th inch tubing. Pump 16 in the preferred embodiment is a constant pressure 12-volt electric pump supplied by Wisa Precision Pumps, USA, Inc. of New Jersey, and having model no. 0401.085.100.0 . Other pumps, whether constant pressure or of other variety, may be used as desired.

Figure 3A:
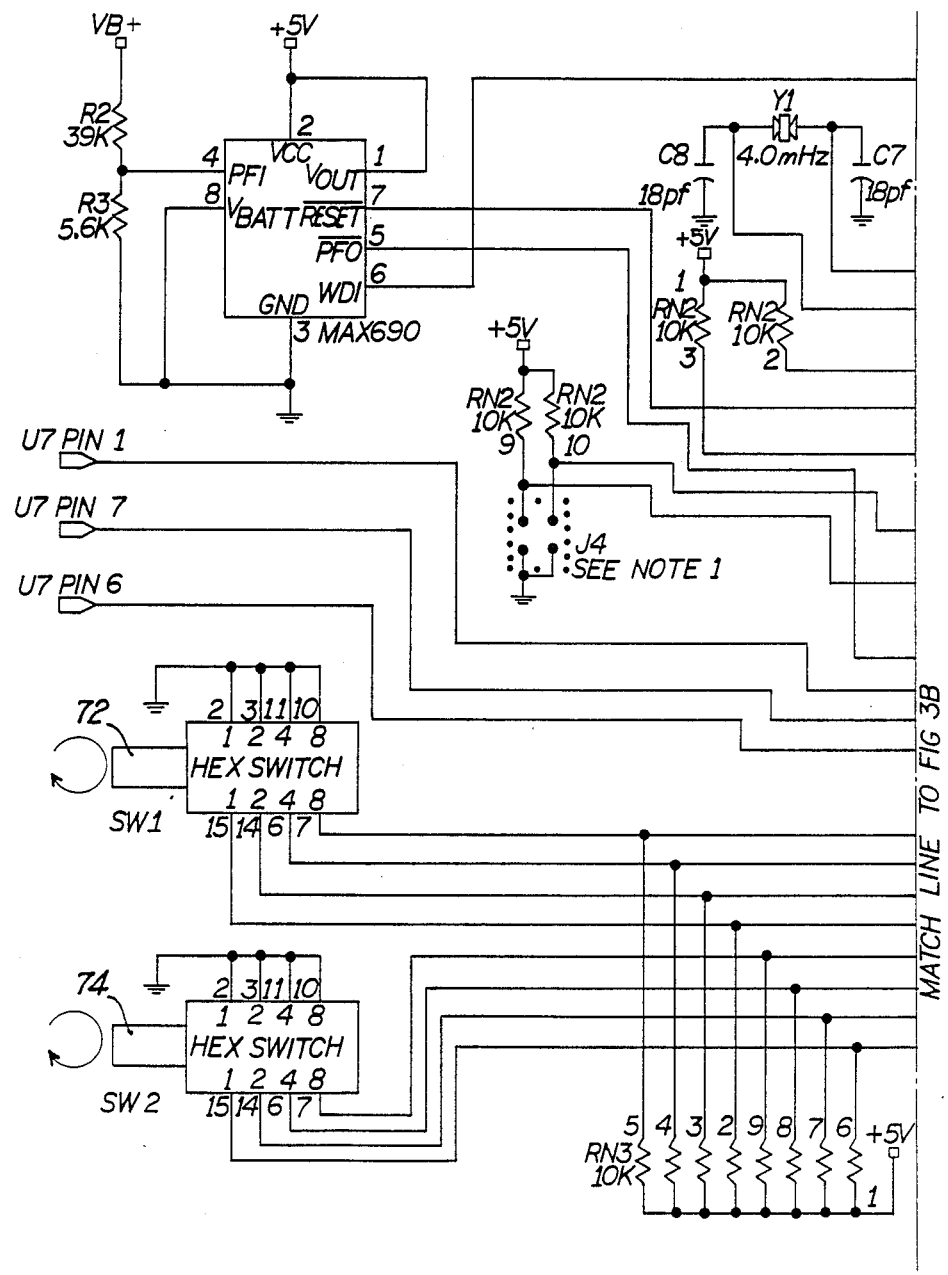
FIGS. 3A and 3B are schematic diagrams showing microprocessor means and input means according to a preferred embodiment of the present invention.
Figure 3B:
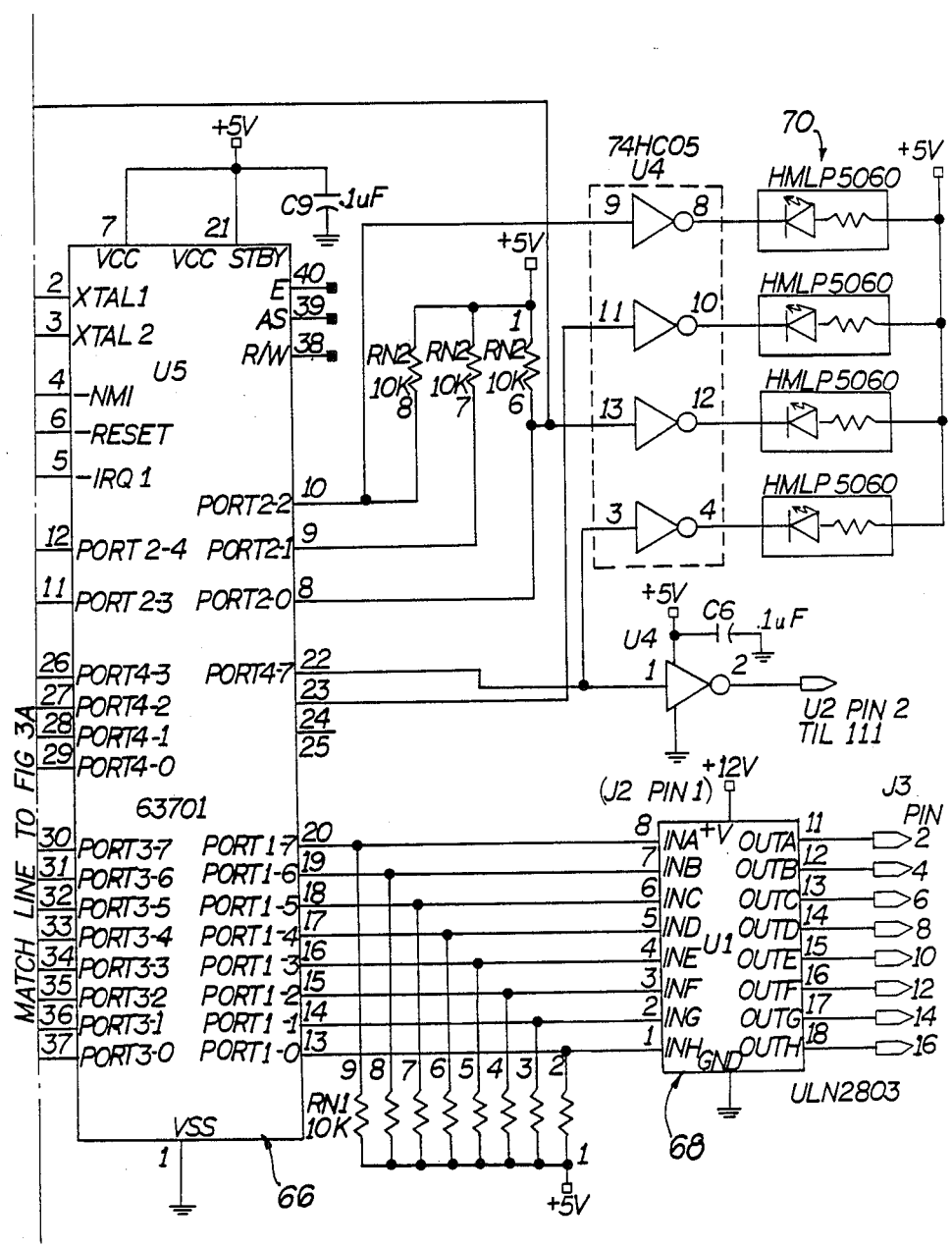

FIGS. 3A, 3B, 4 and 5 show in greater detail a preferred embodiment of microprocessor means 18, sensor means 24, input means 22, power supply 20 and indicating means 26 of the present invention. In that embodiment, four ports of a Hitachi 63701 microprocessor are connected respectively to pump 14, indicator means 26, input means 22 and sensor means 24. Eight pins of port 1 of microprocessor 66, as shown in FIG. 3B, are each connected to an amplifier 68 which controls actuation of each valve 16.

Port 2, together with signals from power supply 20 and pump actuation signals, controls actuation of indicator means 26. Indicator means 26 as shown in FIG. 3B contains four light-emitting diodes 70 which indicate whether the device is actuated, whether the power supply battery is low, whether pump 14 is actuated and whether any of valves 16 are actuated.

Eight pins on port 3 of processor 66 are connected to input means 22 which in the preferred embodiment shown in FIG. 3A are two hex switches 72 and 74. These hex switches allow selection of 16 desired pressures for cells 30 in cushion 12 as well as 16 desired sequences in which rows 28 or zones 29 of cells 30 are to be inflated. Other input means such as binary or dip switches may just as easily be used.

Figure 4:
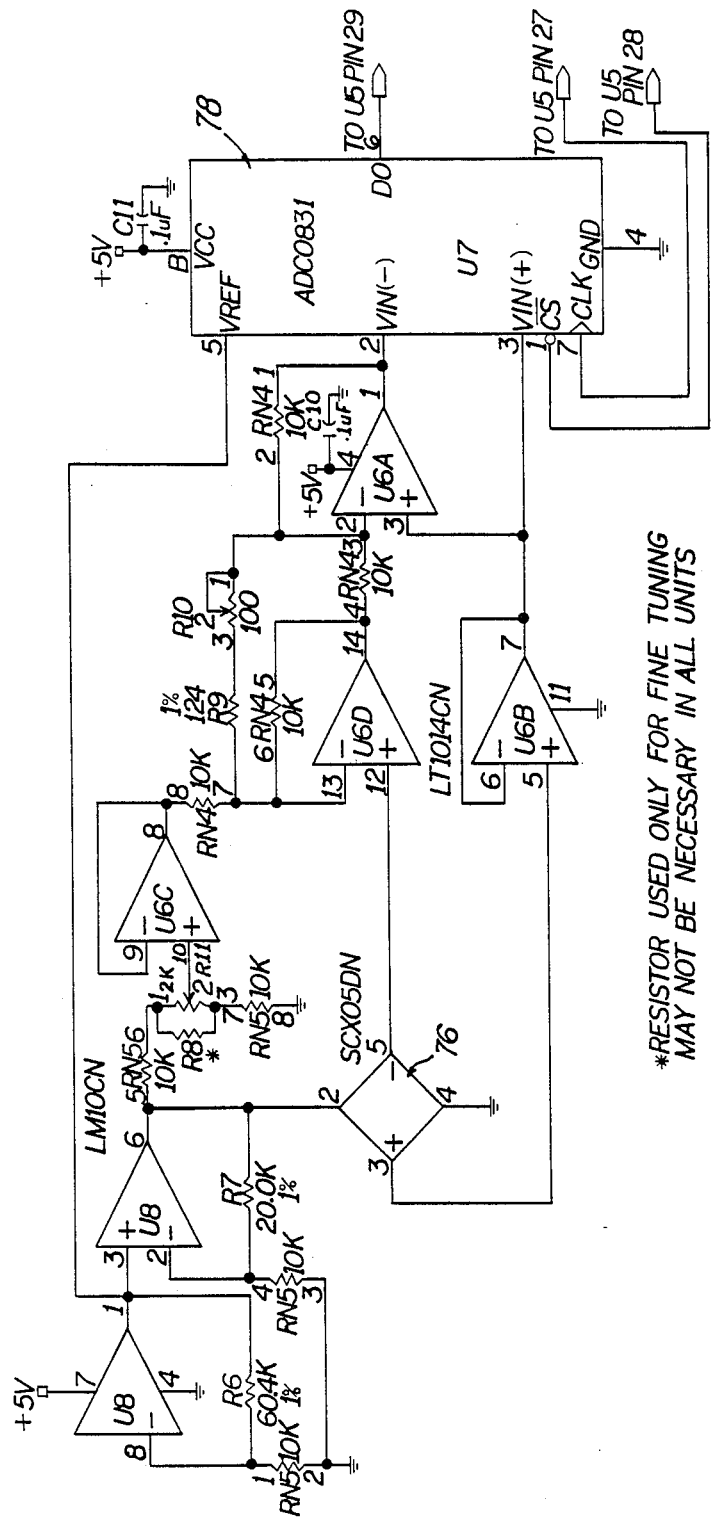
FIG. 4 is a schematic diagram of sensor means of a preferred embodiment of the present invention.

Port 4 of microprocessor 66 is connected to pressure sensor means 24. Sensor means 24 as shown in FIG. 4 is preferably a conventional SCX05D strain gauge 76 mounted on tubing which communicates with intake conduit 64. Such tubing may be damped as desired to counteract pump oscillation and harmonics with reservoirs, constrictions and other conventional fluidics control devices. Alternatively, pressure means 24 can comprise a number of strain gauges 76 mounted to various cells 30 in cushion 12, or one or more strain gauges 76 mounted at other locations. Strain gauges 76 are coupled, through conventional amplification circuits, to an ADC0831 digital-to-analog converter 78 which is in turn connected to three pins on port 4 of microprocessor 66.

Figure 5:
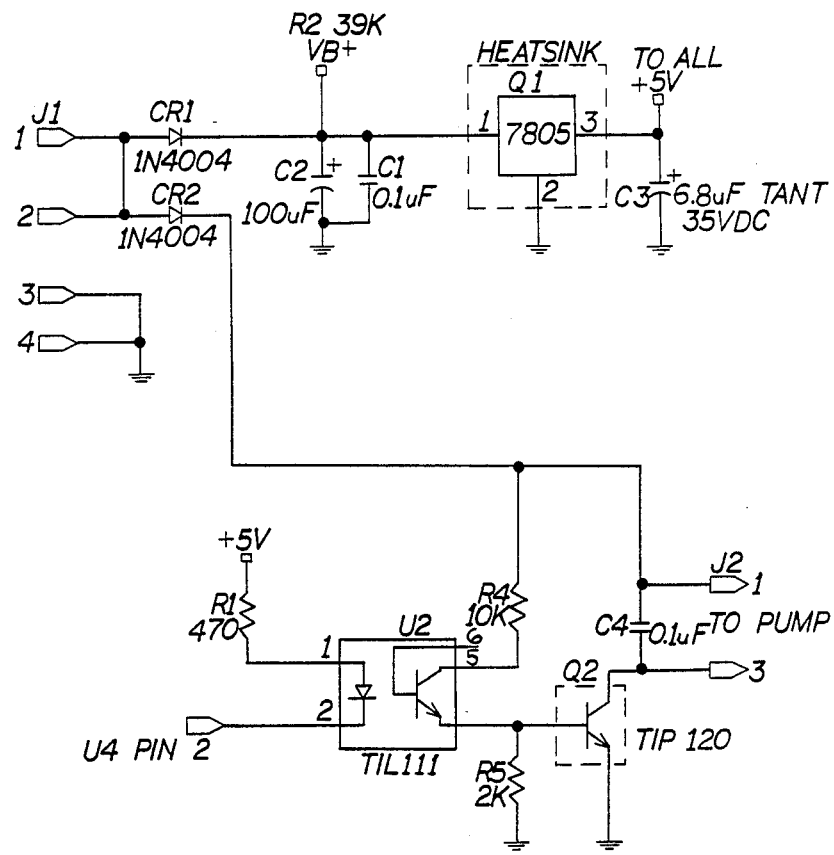
FIG. 5 is a schematic diagram of a portion of power supply means and pump control circuits according to a preferred embodiment of the present invention.

FIG. 5 shows conventional power supply 20 circuits and amplification circuits coupling port 4 of microprocessor 66 to pump 14.

In operation, microprocessor 18 checks input means 22 for the desired sequence in which rows 28 or zones 29 of cells 30 are to be inflated. It then calculates and stores information used to actuate the valves and sets the amount of time that the valves 16 are to be opened or closed. Processor 66 then checks pressure sensor means 24 and input means 22 and determines whether the presser applied to cells 30 is below the desired range. If so, the processor 66 turns on pump 14 for a period of time. If the pressure is above the desired range, on the other hand, the processor 66 opens all valves for a short period of time. It then rechecks pressure sensor means 24 and input means 22 and controls valves 16 accordingly. Processor 66 actuates indicator means 26 as appropriate to indicate when pump 14 or valves 16 are actuated, or when the device is on, or when the battery in power supply 20 is low. A source listing for the program follows:

```
;
;
; Common Equates for 68701/63P01 Single chip micro
;
; Internal 68701/63P01 registers:
;
P1DDR       EQU     $00     ; Port 1 Data Direction Register
P2DDR       EQU     $01     ; Port 2 Data Direction Register
P1          EQU     $02     ; Port 1 Data Register
P2          EQU     $03     ; Port 2 Data Register
P3DDR       EQU     $04     ; Port 3 Data Direction Register
P4DDR       EQU     $05     ; Port 4 Data Direction Register
P3          EQU     $06     ; Port 3 Data Register
P4          EQU     $07     ; Port 4 Data Register
TCSR        EQU     $08     ; Timer Control and Status Register
CTRMSB      EQU     $09     ; Counter Register (MSB)
CTRLSB      EQU     $0A     ; Counter Register (LSB)
OCRMSB      EQU     $0B     ; Output Compare Register (MSB)
OCRLSB      EQU     $0C     ; Output Compare Register (LSB)
ICRMSB      EQU     $0D     ; Input Capture Register (MSB)
ICRLSB      EQU     $0E     ; Input Capture Register (LSB)
P3CSR       EQU     $0F     ; Port 3 Control and Status Register
SPCR        EQU     $10     ; SCI Rate and Mode Control Reg. (RMCR)
SPSR        EQU     $11     ; Trans/Recv Control and Status Reg.
RDR         EQU     $12     ; SCI Receiver Data Register
TDR         EQU     $13     ; SCI Transmit Data Register
RCR         EQU     $14     ;    Control Register
;
;           $15-$1F         Reserved
;

;
;           Common Value Declarations
;
MINUTE      EQU     1200    ; 1200 = 1 minute
SECOND      EQU     20      ;   20 = 1 second
HALF.SEC    EQU     10      ;   10 = .5 second
P.RANGE     EQU     10      ; +/- 10 units/full scale ;
;           RAM Declarations
;
RAM         EQU     $80     ; start of RAM internal
CYCLE       EQU     $80     ; cycle table address, 2 bytes
CYC.TIME    EQU     $82     ; time remaining in cycle, 2 bytes
CUR.CYC     EQU     $84     ; which cycle is being used
CYC.SW      EQU     $85     ; cycle switch setting
TICK        EQU     $86     ;
TICK.SEC    EQU     $87     ;
PUMP.CLK    EQU     $88     ; 60 second pump timer
PUMP.FLG    EQU     $89     ; pump On/Off Flag
HI.PRESS    EQU     $8A     ; high pressure flag
```

```
SYS.STAT       EQU    $8B         ; used to monitor system operation
SYS.LED        EQU    $8C         ; status of last LED command
PRESS.RD       EQU    $8D         ; pressure value from ADC
PRESS.SW       EQU    $8E         ; pressure switch setting
PRESS.LO       EQU    $8F         ; low end of pressure range
PRESS.HI       EQU    $90         ; high end of pressure range
OVER.FLG       EQU    $91         ; over pressure flag
OVER.CLK       EQU    $92         ; 60 second over pressure timer
SIXTY.CK       EQU    $93         ; sixty second clock
VALVES         EQU    $94         ; present setting of valves
FAILSAFE       EQU    $95         ; failsafe setting
;

ORG    $F000       ; start of ROM code

;
;
BEGIN
;
; Initialize Stack:
;
               LDS    #$FF
;
; Initialize OCR Function for Interrupt:
;
               LDAA   #$08        ; Enable Output Compare Interrupt
               ANDA   #$FB        ; clear Enable Timer Overflow Interrupt
               STAA   TCSR        ;

; Set Interrupt to Occur Every 50ms
;
;      Note: The formula for setting up the time base is,
;      (cystral frequency/4) * time resolution = time base count value
;      Using a 4mHz cystral and a time resolution of 50ms, the time
;      base count value equals:
;
;      (4000000/4) * 0.050 = 50000
;
               LDD    CTRMSB      ; put count into Count Compare
               ADDD   #50000      ;   Register (double byte)
               STD    OCRMSB
               LDAA   #SECOND     ; get seconds time value
               STAA   TICK
               STAA   TICK.SEC
               CLR    SIXTY.CK    ; set 60 second clock to zero
               CLI                ; start interrupts
;
; Ports Initialization:
;
               LDAA   #$FF        ; make port 1 output (air valves)
               STAA   P1DDR
               CLR    P1          ; turn off all valves
               LDAA   #$E7        ; make port 2 output except bits 3 & 4
               CLR    P2
               STAA   P2DDR       ;   make them inputs
               CLR    P3DDR       ; make port 3 input (switches)
; Initialize port 4 as follows:
;
```

```
;       Bit     Input/Ouput     Function
;       ---     -----------     --------
;       7       Output          Pump On/Off
;       6       Output          Battery Low LED
;       5       Output          (Not used)
;       4       Input           Battery Low From MAX690
;       3       Output          (Not used)
;       2       Output          ADC0831 Chip Select
;       1       Output          ADC0831 Clock
;       0       Input           ADC0831 Data

LDAA    #$F6
                STAA    P4DDR

LDAA    #$04            ; set outputs to zero except for
                STAA    P4              ;   ADC chip select, set it to 1
;
; Initialize time base for interrupts:
;
                LDAA    #HALF.SEC       ; blink sys status every .5 sec
                STAA    SYS.STAT
                CLR     SYS.LED         ; set status LED off
;
; Check to see if production test needs to be run:

LDAA    #$10            ; mask port 2 for bits 3 $ 4
                BITA    P2              ; see if test switch set
                BNE     NORM.SYS        ; if not, start normal operations
                JSR     PROD.TST        ; else goto production test NORM.SYS
                CLR     PRESS.RD        ; clear following variables
                CLR     PRESS.SW
                CLR     PRESS.LO
                CLR     PRESS.HI
                CLR     FAILSAFE
                CLR     PUMP.FLG
                CLR     PUMP.CLK
                CLR     OVER.FLG ;               LDAA    #2              ; ** for testing **
;               JSR     DELAY           ; ** for testing **
;               JMP     CHK.PRES        ; **** for testing ****

;
; Start of normal operation
;
NEXT.CYC
                JSR     CYCLE.SW        ; get cycle settings
                JSR     CAL.CYC         ; find cycle table entry
                CLR     CUR.CYC         ; clear current cycle count
CYC.REPT
                LDAB    CUR.CYC         ; get current cycle count
                LDX     CYCLE           ; get cycle address
                ABX                     ; add offset
```

```
          LDD       0,X           ; see if at end of table (zeros)
          BEQ       NEXT.CYC      ; if so get next table value
          STAB      P1            ; accumlator B has valve info
          STAB      VALVES        ; save the valve info here too
          CMPB      #$00          ; see if any valves are on
          BEQ       NO.VALVE      ; no valves, turn off LED
          LDAB      P2            ; turn on valve LED
          ORAB      #$04
          STAB      P2
          BRA       VALVE.OK
NO.VALVE
          LDAB      P2            ; turn off valve LED
          ANDB      #$F5
          STAB      P2
VALVE.OK
          PSHA                    ; exchange A & B and clear A
          PULB
          LDAA      #00
          JSR       FND.TIME      ; calculate time value
CHK.CYC
          LDAA      CYC.SW        ; get current cycle switch setting
          JSR       CYCLE.SW      ; check switch
          CBA                     ; see if switch changed
          BNE       NEXT.CYC      ; if so, get new cycle from table
          LDD       CYC.TIME      ; else check for end of time
          BEQ       NEXT.ENT      ; if so, get next entry in table

BRA       CHK.PRES

BRA       CHK.CYC       ; wait for timeout or switch change
NEXT.ENT
          INC       CUR.CYC
          INC       CUR.CYC
          BRA       CYC.REPT
CHK.PRES
          LDAA      PUMP.FLG      ; see if pump is on
          BNE       PUMP.TMR LDAA      OVER.FLG      ; see if overpress flag set
          BNE       ON.PRESS LDAA      #1            ; delay 2 sec before reading
          JSR       DELAY         ; to let pressure settle
          JSR       PRESREAD      ; get latest pressure
          JSR       PRESSSET      ; get latest switch
          CLC
          LDAA      PRESS.RD      ; see if below range
          CMPA      PRESS.LO
          BCS       UP.PRESS      ; if below, incr. pressure

BRA       PUMP.OFF      ; ***** FOR TESTING *****

CMPA      PRESS.HI
          BCC       ON.PRESS      ; if above, release overpress
          BRA       PRES.EXT      ; must be in range
UP.PRESS
          LDAB      P4            ; turn on pump
```

```
                ORAB    #$80
                STAB    P4
                COM     PUMP.FLG        ; set pump flag to on
                LDAA    SIXTY.CK        ; get present number of seconds
                ADDA    #15             ; turn on pump for 15 sec
                CMPA    #60             ; is total greater than 60 sec
                BCS     PUMP.CRR        ; no, use new total
                SUBA    #60             ; yes, subtract 60 sec
PUMP.CRR
                STAA    PUMP.CLK        ; set new pump on time
                BRA     PRES.EXT
PUMP.TMR
                LDAA    PUMP.CLK
                CMPA    SIXTY.CK        ; see if 60 sec are up
                BNE     PRES.EXT        ; exit if not, else turn off pump
PUMP.OFF
                LDAB    P4              ; turn off pump bit, pump off
                ANDB    #$7F
                STAB    P4
                CLR     PUMP.FLG        ; set pump flag to off
                BRA     PRES.EXT
ON.PRESS
                LDAA    #$FF            ; open all valves
                STAA    P1              ; valves on port 1
                LDAA    #2              ; keep open for 2 sec
                JSR     DELAY
                CLR     P1              ; close all valves
                LDAA    #1              ; delay 1 sec
                JSR     DELAY
                LDAB    VALVES          ; return valves to normal
                STAB    P1

BRA     PRES.EXT        ; ***** for testing ****

JSR     PRESREAD        ; get latest pressure
                JSR     PRESSSET        ; get current switch setting LDAA    PRESS.RO        ; check for above or below
                CMPA    PRESS.HI        ;    range LDAB    OVER.FLG        ; is over pressure flag set?
                BNE     SKIP.001        ; yes, do not reset flag
                LDAB    SIXTY.CK        ; get current time
                ADDB    #5              ; add 5 sec
                CMPB    #60             ; is total greater than 60 sec
                BCS     SKIP.000        ; no, use new total
                SUBB    #60             ; yes, subtract 60 sec
SKIP.000
                STAB    OVER.CLK        ; store check time
                COM     OVER.FLG        ; set over pressure flag
                BRA     PRES.EXT
SKIP.001
                LDAA    SIXTY.CK        ; see if time to close valves
                CMPA    OVER.CLK        ;   and check pressure
                BNE     PRES.EXT CLR     P1              ; close all valves
```

```
                JSR     PRESREAD        ; get latest pressure
                JSR     PRESSSET        ; get latest switch LDAA    PRESS.RD        ; see if below range
                CMPA    PRESS.HI
                BCC     PRES.EXT        ; if above, leave valves open
CLOSE.VA
                LDAA    VALVES
                STAA    P1              ; return valves to normal setting
                CLR     OVER.FLG        ; turn off overpressure flag
                BRA     PRES.EXT        ; must be in range
PRES.EXT
                JMP     CHK.PRES        ; ***** for testing *****

NORM.EXT
                JMP     CHK.CYC         ; do it again

TESTL           JMP     NORM.SYS
```

;*********************************************
;
; SUBROUTINE: PRESSSET
;
; This subroutine will read the pressure switch setting from the pcb hex
; switch and return the value into RAM location PRESSURE.SET and in the
; A accumlator.
;
; Entry: none
; Exit : PRESS.SW,A
;
;*********************************************

```
PRESSSET
                LDAB    P3              ; get switch reading
                ANDB    #$0F            ; mask off MSB
                LDX     #PRES.TBL       ; get first entry into table
                ABX                     ; transfer B to index
                LDAA    0,X             ; get pressure from table
                STAA    PRESS.SW        ; store it
                SUBA    #P.RANGE        ; lo and hi range for pressure
                STAA    PRESS.LO
                LDAA    PRESS.SW
                ADDA    #P.RANGE
                STAA    PRESS.HI
                RTS
```

;*********************************************
;
; SUBROUTINE: CYCLE.SW
;
; This subroutine will read the cycle switch setting from the pcb hex
; switch and return the value into RAM location CYCLE.SET and in the A
; accumlator.
;
; Entry: none
; Exit : CYC.SW,B
;
;*********************************************

```
CYCLE.SW
            CLC                     ; clear carry bit
            LDAB    P3              ; get switch reading
            ANDB    #$F0            ; only MSBs
            RORB                    ; shift MSB into LSB only 3 times
            RORB                    ;   to allow a 2 times the value of
            RORB                    ;   B accumlator
            STAB    CYC.SW          ; current switch setting
            RTS                     ; return
```

```
;***************************************
;
; SUBROUTINE: CAL.CYC
;
; This routine calculates the index entry into the cycle table (CYC.TBL)
; and then stores the address of the cycle into CYCLE (2 bytes). This
; information will be used to turn on the valves and set the amount of time
; that the valves are to be opened or closed.
;
; Entry: none
; Exit : none
;
;***************************************
```

```
CAL.CYC
            LDAB    CYC.SW
            LDX     #CYC.TBL        ; get first entry into table
            ABX                     ; transfer B to index
            LDD     0,X             ; get cycle from table
            STD     CYCLE           ; store it
            RTS
```

```
;***************************************
;
; SUBROUTINE: PRESREAD
;
; This subroutine will read the pressure from the pressure gauge and return
; the value into the RAM location PRESSURE.
;
; Entry: none
; Exit : PRESSURE
;
;***************************************
```

```
PRESREAD
            LDAA    P4              ; select the ADC bit, select ADC
            ANDA    #$FB
            STAA    P4
            LDAB    #$0F            ; delay to allow ADC to settle
LOOP.DLY
            DECB
            BNE     LOOP.DLY
            LDAB    #08             ; number of bits to get a byte
            CLR     PRESS.RD        ; clear out old pressure value
            JSR     PULSEADC        ; initial clock pulse for ADC
NEXT.BIT
            JSR     PULSEADC        ; toggle ADC clock input
```

```
            LDAA    P4              ; get data (bit 0) from ADC
            ANDA    #$01            ; mask out all but bit 0
            ORAA    PRESS.RD        ; add it to previous value
            CMPB    #$01            ; is this the LSB?
            BEQ     LAST.BIT        ; if it is then jump next instruction
            ASLA                    ; shift bit into proper place
LAST.BIT
            STAA    PRESS.RD        ; put back
            DECB                    ; check and see if we are finished
            BNE     NEXT.BIT        ; get next one
            LDAA    P4              ; deselect the ADC bit, deselect ADC
            ORAA    #$04
            STAA    P4

RTS                     ; return
```

;********************************************
;
; SUBROUTINE: PULSEADC
;
; Toggle the clock input to the Analog to Digital Converter:
;
; Entry: none
; Exit : none
;
;********************************************

```
PULSEADC
            PSHA                    ; save A & B
            PSHB
            LDAB    P4              ; toggle ADC clock bit high
            ORAB    #$02
            STAB    P4
            LDAB    P4              ; toggle ADC clock bit low
            ANDB    #$FD
            STAB    P4
            PULB                    ; return A & B
            PULA
            RTS                     ; return
```

;********************************************
;
; SUBROUTINE: FND.TIME
;
; This routine calculates the time value by multipling the minute value
; from the cycle table by the value of a minute in ticks. The value is
; then stored in the CYC.TIME memory location and updated by the interrupt
; servicing routine. This routine uses the stack to multiply two 16 bit
; numbers.
;
;               A:B * X ---> A:B
;
; Entry: A:B (number of minutes)
; Exit : CYC.TIME (number of ticks)
;
;********************************************

```
FND.TIME
            PSHX                    ; save all registers
            PSHB                    ; push multiplicand onto stack (LSB)
            PSHA                    ;   (MSB)
            LDX     #MINUTE         ; get minute value
            PSHX                    ; push onto stack
            LDAA    #16             ; use 16 as the count
            PSHA
            TSX                     ; use x to point at stack ; **************************************************
;
; Note: Stack now looks like this
;
;           +0      count
;           +1      MSB multiplicand
;           +2      LSB    "
;           +3      MSB multiplier
;           +4      LSB    "
;           +5      MSB X register
;           +6      LSB    "
;           +7      MSB return address
;           +8      LSB    "
;
; **************************************************

LDAA    3,X
MUL002
            ASLD                    ; form the results
            ASL     2,X             ; shift multiplicand
            ROL     1,X
            BCC     MUL004
            ADDD    3,X             ; add multiplier
MUL004
            DEC     x
            BNE     MUL002

; Clean up stack and return

INS                     ; bump stack pointer
            PULX                    ; bump it twice
            PULX                    ; bump it twice
            PULX                    ; once more to restore X
            STD     CYC.TIME
            RTS ; **************************************************
;
; SUBROUTINE: DELAY
;
; This provides a delay in second(s) based upon the value passed to it from
; the A accumlator. The routine uses a running clock that is keep in the
; interrupt routine.
;
; Entry: A
; Exit : none
;
; **************************************************
```

```
DELAY
            LDAB    SIXTY.CK        ; get present time
            ABA
            CMPA    #60             ; see if greater than 60 seconds
            BCC     DELAY.1
DELAY.0
            CMPA    SIXTY.CK        ; wait for two to compare
            BNE     DELAY.0
            RTS                     ; return
DELAY.1
            SUBA    #60             ; correct > than 60 seconds
            BRA     DELAY.0

;********************************************
;
; SUBROUTINE: PROD.TST
;
; This routine is to used during production of the board at final checkout
; and during calibation. Depending upon the switch settings one of the
; two following test will be performed. Test one will read the input switches
; and display the position of the switches on the air valve output using a
; display adaptor. Test two will allow for the calibation of the pressure
; sensor for reading zero and full scale. The adjustments will be made using
; the two potentiometer, one for zero readings and the other for full scale.
;
; Entry: none
; Exit : none
;
;********************************************

PROD.TST
            SEI                     ; stop all interrputs during test
            LDAB    P2              ; get port 2 data
            ANDB    #$F8            ; turn off all LEDs
            STAB    P2
TST.STRT
            LDAA    P2              ; reset WATCHDOG
            ANDA    #$F8            ; clear LEDs
            STAA    P2
            ORAA    #$01            ; toggle Bit 1, WATCHDOG
            STAA    P2
            ANDA    #$F8
            STAA    P2              ; WATCHDOG has been toggled LDAB    #$08            ; check to see which test to perform
            BITB    P2              ; if set then test two, else test
            BEQ     TEST.TWO        ;   one
TEST.ONE
            LDAB    P2              ; clear LEDs
            ANDB    #$FE
            STAB    P2
            LDAA    P3              ; get input switches, port 3
            STAA    P1              ; output to display adaptor, port 1
            BRA     TEST.END        ; see if finished with tests
TEST.TWO
            JSR     PRESREAD        ; take the latest pressure value
            LDAB    PRESS.RD        ; get the value
```

```
                STAB    P1              ; send value to port1 for testing
                CMPB    #$00            ; if value is $00 then turn on low
                BEQ     TST.2.LO        ;   LED
                CMPB    #$FF            ; if value is $FF then turn on hi
                BEQ     TST.2.HI        ;   LED
                LDAB    P2              ; if either then make sure LEDs are
                ANDB    #$F8            ;   off
                STAB    P2
                JMP     TEST.END        ; see if finished with tests
TST.2.LO        LDAB    P2              ; get port 2 data
                ANDB    #$F8            ; first turn off then on
                ORAB    #$04            ; turn on low LED
                STAB    P2
                BRA     TEST.END
TST.2.HI        LDAB    P2              ; get port 2 data
                ANDB    #$F8            ; first turn off then on
                ORAB    #$01            ; turn on hi LED
                STAB    P2
TEST.END
                LDAB    #$10            ; check test switch
                BITB    P2              ; see if still set
                BEQ     TST.STRT        ; if set then do it again
                LDAB    P2              ; clear LEDs
                ANDB    #$F8
                STAB    P2
                CLR     P1              ; clear port 1
                LDD     CTRMSB          ; reset timer interrupts
                ADDD    #50000
                STD     OCRMSB
                CLI                     ; start interrupts
                RTS                     ; return to main program ;********************************************
;
; SUBROUTINE: OCFIR (Interrupt Request 2 (IRQ2))
;
; Timer Output Compare Interrupt Routine (Internal Clock) and internal
; clock routine for time keeping functions. Checks conditions of battery
; power and set failsafe flag.
;
; Entry: none
; Exit : none
;
;********************************************

OCFIR
                PSHX                    ; save everything worth saving
                PSHB
                PSHA
                TPA
                PSHA
                LDAA    TCSR            ; clear interrupt
                LDD     CTRMSB
                ADDD    #50000          ; do it every 50 milliseconds
                STD     OCRMSB          ; get ready for next scan
                LDD     CYC.TIME        ; time remaining in cycle
                BEQ     EXIT            ; no time remaining, so exit
```

```
                CLC                         ; substact one tick from time
                SBCB    #$01                ;   remaining
                BCC     SKIP.1              ; not less than zero, yet
                CLC
                SBCA    #$01
SKIP.1
                STD     CYC.TIME            ; put new time back
                DEC     TICK                ; see if 1 second is up
                BNE     EXIT                ; just passing through
                LDAB    #SECOND             ; reload second value
                STAB    TICK
EXIT
                DEC     TICK.SEC            ; decrement second's tick counter
                BNE     EXIT.0              ; not zero yet
                LDAA    #SECOND             ; reload if zero
                STAA    TICK.SEC
                INC     SIXTY.CK            ; increment sixty second clock
                LDAB    #60                 ; see if at sixty
                CMPB    SIXTY.CK
                BNE     EXIT.0              ; skip, if not
                CLR     SIXTY.CK
EXIT.0
                DEC     SYS.STAT            ; see is sys status timed out yet
                BNE     EXIT.1              ; no, not yet
                LDAA    #HALF.SEC           ; reload counter for .5 sec
                STAA    SYS.STAT
                LDAA    SYS.LED             ; get last LED status
                CMPA    #$00                ; is it off?
                BEQ     LED.ON              ; if yes, then turn it on
                CLR     SYS.LED             ; must be on, so turn it off
                LDAA    P2
                ANDA    #$FE
                STAA    P2
                BRA     EXIT.1
LED.ON
                COM     SYS.LED             ; update LED status to on
                LDAA    P2                  ; turn on status LED
                ORAA    #$01
                STAA    P2
EXIT.1

;
; Battery voltage low condition routine. Only function is to let
; the patient know that the battery voltage is below safe operating
; condition.
;

BATTERY
                LDAA    P4                  ; get port 4 data
                ANDA    #$08                ; see if low battery exsist
                BEQ     BATT.LOW
                LDAA    FAILSAFE
                CMPA    #$00
                BEQ     BATT.OK
                LDAA    P4
                ANDA    #$BF                ; turn off LED
                STAA    P4
```

```
                CLR     FAILSAFE        ; return to a safe condition
                BRA     BATT.OK
BATT.LOW
                LDAA    P4              ; get port 2 data
                ORAA    #$40            ; turn on low battery LED
                STAA    P4              ;
                LDAA    FAILSAFE        ; check failsafe condition
                CMPA    #$FF
                BEQ     BATT.OK         ; condition already set
                COM     FAILSAFE        ; set failsafe to unsafe
BATT.OK LDAA    #$08            ; make sure ETOI is set
                ANDA    #$FB
                STAA    TCSR
                PULA                    ; return everything back to normal
                TAP
                PULA
                PULB
                PULX
                RTI                     ; start interrupts
;
; Pressure value data table
;
PRES.TBL
                FCB     16
                FCB     32
                FCB     48
                FCB     64
                FCB     80
                FCB     96
                FCB     112
                FCB     128
                FCB     144
                FCB     160
                FCB     176
                FCB     192
                FCB     208
                FCB     224
                FCB     240
                FCB     240

;
; Data Table for the Cycle tables
;
CYC.TBL
                FDB     CYCLE0
                FDB     CYCLE1
                FDB     CYCLE2
                FDB     CYCLE3
                FDB     CYCLE4
                FDB     CYCLE5
                FDB     CYCLE6
                FDB     CYCLE7
                FDB     CYCLE8
                FDB     CYCLE9
                FDB     CYCLE10
```

```
            FDB     CYCLE11
            FDB     CYCLE12
            FDB     CYCLE13
            FDB     CYCLE14
            FDB     CYCLE15
;
; Data Tables for each cycle:
;
CYCLE0
            FDB     $0301
            FDB     $0500
            FDB     $0302
            FDB     $0500
            FDB     $0304
            FDB     $0500
            FDB     $0308
            FDB     $0500
            FDB     $0310
            FDB     $0500
            FDB     $0320
            FDB     $0500
            FDB     $0340
            FDB     $0500
            FDB     $0380
            FDB     $0500
            FDB     $0000   ;END OF TABLE CYCLE1
            FDB     $0201
            FDB     $0300
            FDB     $0202
            FDB     $0300
            FDB     $0204
            FDB     $0300
            FDB     $0208
            FDB     $0300
            FDB     $0210
            FDB     $0300
            FDB     $0220
            FDB     $0300
            FDB     $0240
            FDB     $0300
            FDB     $0280
            FDB     $0300
            FDB     $0000   ;END OF TABLE
;
CYCLE2
            FDB     $0180
            FDB     $0100
            FDB     $0140
            FDB     $0100
            FDB     $0120
            FDB     $0100
            FDB     $0110
            FDB     $0100
            FDB     $0108
            FDB     $0100
```

```
        FDB     $0104
        FDB     $0100
        FDB     $0102
        FDB     $0100
        FDB     $0101
        FDB     $0100
        FDB     $0000   ;END OF TABLE
;
CYCLE3
        FDB     $0108
        FDB     $0500
        FDB     $0110
        FDB     $0500
        FDB     $0104
        FDB     $0500
        FDB     $0120
        FDB     $0500
        FDB     $0102
        FDB     $0500
        FDB     $0140
        FDB     $0500
        FDB     $0101
        FDB     $0500
        FDB     $0180
        FDB     $0500
        FDB     $0000   ;END OF TABLE
;
CYCLE4
        FDB     $0108
        FDB     $0200
        FDB     $0110
        FDB     $0200
        FDB     $0104
        FDB     $0200
        FDB     $0120
        FDB     $0200
        FDB     $0102
        FDB     $0200
        FDB     $0140
        FDB     $0200
        FDB     $0101
        FDB     $0200
        FDB     $0180
        FDB     $0200
        FDB     $0000   ;END OF TABLE
;
CYCLE5
        FDB     $0108
        FDB     $0100
        FDB     $0110
        FDB     $0100
        FDB     $0104
        FDB     $0100
        FDB     $0120
        FDB     $0100
        FDB     $0102
        FDB     $0100
```

```
            FDB     $0140
            FDB     $0100
            FDB     $0101
            FDB     $0100
            FDB     $0180
            FDB     $0100
            FDB     $0000   ;END OF TABLE
;
CYCLE6
            FDB     $0202
            FDB     $0400
            FDB     $0240
            FDB     $0400
            FDB     $0204
            FDB     $0400
            FDB     $0220
            FDB     $0400
            FDB     $0208
            FDB     $0400
            FDB     $0210
            FDB     $0400
            FDB     $0000   ;END OF TABLE
;
CYCLE7
            FDB     $0104
            FDB     $0300
            FDB     $0120
            FDB     $0300
            FDB     $0108
            FDB     $0300
            FDB     $0110
            FDB     $0300
            FDB     $0000   ;END OF TABLE
;
CYCLE8
            FDB     $0104
            FDB     $0300
            FDB     $0120
            FDB     $0300
            FDB     $0108
            FDB     $0300
            FDB     $0110
            FDB     $0300
            FDB     $0108
            FDB     $0300
            FDB     $0110
            FDB     $0300
            FDB     $0000   ;END OF TABLE
;
CYCLE9
            FDB     $0202
            FDB     $0300
            FDB     $0240
            FDB     $0300
            FDB     $0204
            FDB     $0300
            FDB     $0220
```

```
            FDB     $0300
            FDB     $0208
            FDB     $0300
            FDB     $0210
            FDB     $0300
            FDB     $0000   ;END OF TABLE
;
CYCLE10
            FDB     $0201
            FDB     $0300
            FDB     $0280
            FDB     $0300
            FDB     $0202
            FDB     $0300
            FDB     $0240
            FDB     $0300
            FDB     $0204
            FDB     $0300
            FDB     $0220
            FDB     $0300
            FDB     $0208
            FDB     $0300
            FDB     $0210
            FDB     $0300
            FDB     $0000   ;END OF TABLE
;
CYCLE11
            FDB     $0101
            FDB     $0300
            FDB     $0180
            FDB     $0300
            FDB     $0102
            FDB     $0300
            FDB     $0140
            FDB     $0300
            FDB     $0104
            FDB     $0300
            FDB     $0120
            FDB     $0300
            FDB     $0108
            FDB     $0300
            FDB     $0110
            FDB     $0300
            FDB     $0000   ;END OF TABLE
;
CYCLE12
            FDB     $0104
            FDB     $0200
            FDB     $0120
            FDB     $0200
            FDB     $0108
            FDB     $0200
            FDB     $0110
            FDB     $0200
            FDB     $0000   ;END OF TABLE
```

```
;
CYCLE13
            FDB     $0108
            FDB     $0500
            FDB     $0110
            FDB     $0500
            FDB     $0104
            FDB     $0500
            FDB     $0120
            FDB     $0500
            FDB     $0102
            FDB     $0500
            FDB     $0140
            FDB     $0500
            FDB     $0000   ;END OF TABLE
;
CYCLE14
            FDB     $0204
            FDB     $0300
            FDB     $0220
            FDB     $0300
            FDB     $0000   ;END OF TABLE
;
CYCLE15
            FDB     $0101
            FDB     $0300
            FDB     $0180
            FDB     $0300
            FDB     $0102
            FDB     $0300
            FDB     $0140
            FDB     $0300
            FDB     $010C
            FDB     $0300
            FDB     $0130
            FDB     $0000   ;END OF TABLE
;

;
;
LASTBYTE
;
            ORG     $FFEE
;
TRAP.V      FDB     BEGIN
SCI.V       FDB     BEGIN
TOF.V       FDB     BEGIN
OCF.V       FDB     OCFIR
ICF.V       FDB     BEGIN
IRQ.V       FDB     BEGIN
SWI.V       FDB     BEGIN
NMI.V       FDB     BEGIN
RST.V       FDB     BEGIN
            END
```

```
0001            ; :co=6        ing color with Z editor (vi) under MSDOS
0002            ; :43=1        ing EGA with Z editor (vi) under MSDOS
0003            ; :ts=8        for using the Visual Editor (vi) under UNIX
0004            ; *******************************
0005            ;
0006            ; PROJECT:
0007            ;
0008            ;
0009            ; Written by : Charles L. O'Englere
0010            ; Copyright 1987
0011            ; Revision Date : 17 November 1987
0012            ; Revision Number : 2.3
0013            ;
0014            ;
0015            ;
0016            ;
0017            ; 2.3 Corrected problem with WATCHDOG circuit while in tes
0018            ;
0019            ; 2.2 Deleted old pressure reading and motor control softw
0020            ;     with a more efficient routine.
0021            ;
0022            ; 2.1 Corrected problem with port 2 setup. Added battery m
0023            ;     to turn on LED when battery equals 10 volts.
0024            ;
0025            ; 2.0 Re-wrote the software routine for handling interrupt
0026            ;
0027            ; 1.0 Initial software program.
0028            ;
0029            ; *******************************
0030            ;
0031            ;
0032            ; Common Equates for 68701/63P01 Single chip micro
0033            ;
0034            ; Internal 68701/63P01 registers:
0035            ;
0036 0000       P1DDR    EQU    $00        ; Port 1 Data Direction Regis
0037 0001       P2DDR    EQU    $01        ; Port 2 Data Direction Regis
0038 0002       P1       EQU    $02        ; Port 1 Data Register
0039 0003       P2       EQU    $03        ; Port 2 Data Register
0040 0004       P3DDR    EQU    $04        ; Port 3 Data Direction Regis
0041 0005       P4DDR    EQU    $05        ; Port 4 Data Direction Regis
0042 0006       P3       EQU    $06        ; Port 3 Data Register
0043 0007       P4       EQU    $07        ; Port 4 Data Register
0044 0008       TCSR     EQU    $08        ; Timer Control and Status Re
0045 0009       CTRMSB   EQU    $09        ; Counter Register (MSB)
0046 000A       CTRLSB   EQU    $0A        ; Counter Register (LSB)
0047 000B       OCRMSB   EQU    $0B        ; Output Compare Register (MS
0048 000C       OCRLSB   EQU    $0C        ; Output Compare Register (LS
0049 000D       ICRMSB   EQU    $0D        ; Input Capture Register (MSB
0050 000E       ICRLSB   EQU    $0E        ; Input Capture Register (LSB
0051 000F       P3CSR    EQU    $0F        ; Port 3 Control and Status R
0052 0010       SPCR     EQU    $10        ; SCI Rate and Mode Control R
0053 0011       SPSR     EQU    $11        ; Trans/Recv Control and Stat
0054 0012       RDR      EQU    $12        ; SCI Receiver Data Register
0055 0013       TDR      EQU    $13        ; SCI Transmit Data Register
0056 0014       RCR      EQU    $14        ; RAM Control Register
0057            ;
0058            ;
```

```
0059                    ;
0060
0061                    ;
0062                    ;
0063                    ;
0064 0480       MINUTE    EQU      1200       ; 1200 = 1 minute
0065 0014       SECOND    EQU      20         ;   20 = 1 second
0066 000A       HALF.SEC  EQU      10         ;   10 = .5 second
0067 000A       P.RANGE   EQU      10         ; +/- 10 units/full scale
0068
0069                    ;
0070                    ;
0071                    ;
0072 0080       RAM       EQU      $80        ; start of RAM internal
0073 0080       CYCLE     EQU      $80        ; cycle table address, 2 byte
0074 0082       CYC.TIME  EQU      $82        ; time remaining in cycle, 2
0075 0084       CUR.CYC   EQU      $84        ; which cycle is being used
0076 0085       CYC.SW    EQU      $85        ; cycle switch setting
0077 0086       TICK      EQU      $86        ;
0078 0087       TICK.SEC  EQU      $87        ;
0079 0088       PUMP.CLK  EQU      $88        ; 60 second pump timer
0080 0089       PUMP.FLG  EQU      $89        ; pump On/Off Flag
0081 008A       HI.PRESS  EQU      $8A        ; high pressure flag
0082 008B       SYS.STAT  EQU      $8B        ; used to monitor system oper
0083 008C       SYS.LED   EQU      $8C        ; status of last LED command
0084 008D       PRESS.RD  EQU      $8D        ; pressure value from ADC
0085 008E       PRESS.SW  EQU      $8E        ; pressure switch setting
0086 008F       PRESS.LO  EQU      $8F        ; low end of pressure range
0087 0090       PRESS.HI  EQU      $90        ; high end of pressure range
0088 0091       OVER.FLG  EQU      $91        ; over pressure flag
0089 0092       OVER.CLK  EQU      $92        ; 60 second over pressure tim
0090 0093       SIXTY.CK  EQU      $93        ; sixty second clock
0091 0094       VALVES    EQU      $94        ; present setting of valves
0092 0095       FAILSAFE  EQU      $95        ; failsafe setting
0093                    ;
0094
0095 F000                ORG      $F000      ; start of ROM code
0096
0097                    ;
0098                    ;
0099 F000       BEGIN
0100                    ;
0101                    ; Initialize Stack:
0102                    ;
0103 F000 8E00FF          LDS      #$FF
0104                    ;
0105                    ; Initialize OCR Function for Interrupt:
0106                    ;
0107 F003 8608            LDAA     #$08       ; Enable Output Compare Inter
0108 F005 84F8            ANDA     #$F8       ; clear Enable Timer Overflow
0109 F007 9708            STAA     TCSR       ;
0110
0111                    ;
0112                    ; Set Interrupt to Occur Every 50ms:
0113                    ;
0114                    ;
0115                    ;
0116                    ;
```

What is claimed is:

1. A controllably inflatable device, comprising:
   A. a cushion which includes:
      (i) a plurality of zones of independently inflatable cells;
      (ii) a web connected to, supporting and sealing each of the cells;
      (iii) for each zone of cells, a passageway in the web which communicates with each cell in the zone to inflate the cells in the zone; and
      (iv) an aeration manifold attached to the web comprising a plurality of tubular aeration ducts, each duct located between cells, closed at one end and penetrated by a plurality of holes; and a common tubular duct connected to and communicating with the open end of each aeration duct;
   B. a plurality of valves, each valve corresponding to at least one zone of cells and including:
      (i) an intake port for receiving pressurized air from a pump;
      (ii) a pressure port for supplying pressurized air to the valve's corresponding zone of cells;
      (iii) an exhaust port for supplying exhaust air to the aeration manifold;
      (iv) gate means for controlling opening and closure of each of the ports; and
      (v) actuation means connected to the gate means for actuating the gate means;
   C. a pump for supplying pressurized air to the valves;
   D. a plurality of tubular pressurization conduits, each connecting a pressure port of a valve to the valve's corresponding cell zone passageway;
   E. at least one tubular intake conduit connecting the pump to the intake ports of the valves;
   F. at least one tubular exhaust conduit connecting the exhaust ports of the valves to the common duct of the aeration manifold;
   G. microprocessor means electrically connected to the actuation means of each valve and to the pump for controlling operation of each valve and the pump;
   H. a power supply connected to the pump, the actuation means of the valves and the microprocessor means.

2. A device according to claim 1 further comprising pressure sensor means connected to the microprocessor means for providing control feedback signals to the microprocessor means regarding pressure within the cushion.

3. A device according to claim 2 in which the pressure sensor means comprises at least one strain gauge which monitors air pressure in the intake conduit.

4. A device according to claim 1 in which the microprocessor means controls actuation of the pump.

5. A device according to claim 1 further comprising input means connected to the microprocessor means for providing input signals to the microprocessor means relating to sequences in which zones of cells are to be inflated.

6. A device according to claim 5 in which the input means comprises a rotary hex switch.

7. A device according to claim 1 further comprising input means connected to the microprocessor means for providing input signals to the microprocessor means relating to the pressure at which the cushion is to be inflated.

8. A device according to claim 7 in which the pressure input means comprises a rotary hex switch.

9. A device according to claim 1 further comprising indicator means connected to the microprocessor means for indicating when the pump and the valves are actuated and the status of the power supply.

10. A device according to claim 9 in which the indicator means comprise a first light emitting diode to indicate when the pump is actuated, a second light emitting diode to indicate when a valve is actuated, and a third light emitting diode to indicate when the power supply is low.

11. A controllably inflatable device, comprising:
    A. a cushion which includes:
       (i) a plurality of rows of independently inflatable cells;
       (ii) a web connected to, supporting and sealing each of the cells;
       (iii) for each row of cells, a passageway in the web which communicates with each cell in the row to inflate the cells in the row; and
       (iv) an aeration manifold attached to the web comprising a plurality of tubular aeration ducts, each duct located between two adjacent rows of cells, closed at one end and penetrated by a plurality of holes; and a common tubular duct connected to and communicating with the open end of each aeration duct;
    B. a plurality of valves, each valve corresponding to a row of cells and including:
       (i) an intake port for receiving pressurized air from a pump;
       (ii) a pressure port for supplying pressurized air to the valve's corresponding row of cells;
       (iii) an exhaust port for supplying exhaust air to the aeration manifold;
       (iv) gate means for controlling opening and closure of each of the ports; and
       (v) actuation means connected to the gate means for actuating the gate means;
    C. a pump for supplying pressurized air to the valves;
    D. a plurality of tubular pressurization conduits, each connecting a pressure port of a valve to the valve's corresponding cell row passageway;
    E. at least one tubular intake conduit connecting the pump to the intake ports of the valves;
    F. at least one tubular exhaust conduit connecting the exhaust ports of the valves to the common duct of the aeration manifold;
    G. microprocessor means electrically connected to the actuation means of each valve and to the pump for controlling operation of each valve and the pump, which microprocessor means comprises:
       (i) a first port for supplying signals to control each of the valves;
       (ii) a second port for controlling indicator means regarding the status of the device;
       (iii) a third port for receiving signals from input means regarding pressure and sequence at which cells are to be inflated; and
       (iv) a fourth port for receiving signals from a pressure sensor means regarding pressure supplied to the cells of the cushion;
    H. indicator means connected to the second port of the microprocessor means for indicating the status of the device;
    I. at least one input means connected to the third port of the microprocessor means for providing input signals to the microprocessor means relating to pressure at which the cushion is to be inflated and sequences in which rows of cells are to be inflated;

J. a sensor means which monitors pressure in the intake conduit and is connected to the fourth port of the microprocessor means for supplying control feedback signals to the microprocessor means regarding pressure supplied to the cushion; and K. a power supply connected to the pump, the actuation means of the valves and the microprocessor means.

12. A device according to claim 11 in which the microprocessor means is programmed to monitor the input means for information relating to pressure at which the cushion is to be inflated and the sequence in which rows of cells are to be inflated, monitor the pressure sensor means to determine a representative pressure supplied to the cushion, actuate the indicator means to reflect the current state of the device, actuate the pump to supply air to the cushion and actuate the valves in a sequence corresponding to the signals received from the input means to control inflation of the cushion.

* * * * *